US012614959B2

(12) United States Patent
Takahashi

(10) Patent No.: US 12,614,959 B2
(45) Date of Patent: Apr. 28, 2026

(54) ARMATURE WINDING AND METHOD FOR MANUFACTURING SAME

(71) Applicant: DENSO CORPORATION, Kariya-city (JP)

(72) Inventor: Yuki Takahashi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 237 days.

(21) Appl. No.: 18/453,957

(22) Filed: Aug. 22, 2023

(65) Prior Publication Data

US 2024/0039381 A1      Feb. 1, 2024

Related U.S. Application Data

(63) Continuation of application No. PCT/JP2022/005327, filed on Feb. 10, 2022.

(30) Foreign Application Priority Data

Feb. 24, 2021      (JP) ................................. 2021-027627

(51) Int. Cl.
| | |
|---|---|
| *H02K 21/12* | (2006.01) |
| *H02K 3/30* | (2006.01) |
| *H02K 15/33* | (2025.01) |

(52) U.S. Cl.
CPC ............... *H02K 21/12* (2013.01); *H02K 3/30* (2013.01); *H02K 15/33* (2025.01); *H02K 2203/06* (2013.01)

(58) Field of Classification Search
CPC . H01F 5/06; H02K 3/47; H02K 3/522; H02K 15/12; H02K 3/42; H02K 3/04; H02K 15/095; H02K 5/225; H02K 15/0431; H02K 3/38; H02K 15/105
See application file for complete search history.

(56) References Cited

U.S. PATENT DOCUMENTS

| | | | | |
|---|---|---|---|---|
| 2006/0267440 A1* | 11/2006 | Sakai | ................... | H02K 15/064 |
| | | | | 310/184 |
| 2011/0036614 A1* | 2/2011 | Otsuka | .................... | C22C 21/00 |
| | | | | 156/50 |
| 2011/0181144 A1* | 7/2011 | Ishizuka | .................. | H02K 3/38 |
| | | | | 310/180 |
| 2020/0161939 A1 | 5/2020 | Takahashi et al. | | |

(Continued)

FOREIGN PATENT DOCUMENTS

JP      5251219 B2      7/2013

*Primary Examiner* — Leda T Pham
(74) *Attorney, Agent, or Firm* — Precision Patents, P.C.

(57) ABSTRACT

In a multiphase armature winding provided in an armature that constitutes a rotating electric machine and that is configured by conductive wire material, the conductive wire material for each phase includes an assembly of strands having a conductor and an inner insulating layer of insulating material surrounding the conductor, and an outer insulating layer of insulating material surrounding the assembly of strands. The outer insulating layer is peeled off at an end of the conductive wire material. A tip of the conductive wire material at the peeled portion of the outer insulating layer is joined by welding or crimping to form a joint portion. At least a portion other than the joint portion, in the conductive wire material at the peeled portion of the outer insulating layer, is varnished.

14 Claims, 8 Drawing Sheets

(56)     References Cited

U.S. PATENT DOCUMENTS

| 2020/0162003 | A1 | 5/2020 | Takahashi et al. |
| 2022/0006356 | A1 | 1/2022 | Takahashi et al. |
| 2022/0006357 | A1 | 1/2022 | Takahashi et al. |
| 2022/0006358 | A1 | 1/2022 | Takahashi et al. |
| 2022/0014074 | A1 | 1/2022 | Takahashi et al. |
| 2022/0014075 | A1 | 1/2022 | Takahashi et al. |
| 2022/0045578 | A1 | 2/2022 | Takahashi et al. |

* cited by examiner

ARMATURE WINDING AND METHOD FOR MANUFACTURING SAME

CROSS REFERENCE TO RELATED APPLICATIONS

This application is a continuation application of International Patent Application No. PCT/JP2022/005327 filed on Feb. 10, 2022, which designated the U.S. and based on and claims the benefits of priority of Japanese Patent Application No. 2021-027627 filed on Feb. 24, 2021. The entire disclosure of all of the above applications is incorporated herein by reference.

TECHNICAL FIELD

The present disclosure relates to an armature winding and method for manufacturing the same.

BACKGROUND

Conventionally, an armature having multiphase armature windings made of conductive wires is known.

SUMMARY

In a multiphase armature winding having a conductive wire material and provided in an armature that constitutes a rotating electric machine, the conductive wire material of each phase includes an assembly of strands having a conductor and an inner insulating layer made of an insulating material covering the conductor, and an outer insulating layer surrounding the assembly of strands and made of an insulating material.

The outer insulating layer is peeled off at an end of the conductive wire material, a tip of the conductive wire material at the peeled portion of the outer insulating layer is joined by welding or crimping to form a joint portion, and at least a portion other than the joint portion, in the conductive wire material at the peeled portion of the outer insulating layer, is varnished.

BRIEF DESCRIPTION OF DRAWINGS

The above and other objects, features and advantages of the present disclosure will become more apparent from the following detailed description when taken in conjunction with the accompanying drawings.

In the drawings.

DETAILED DESCRIPTION

Figure 1:
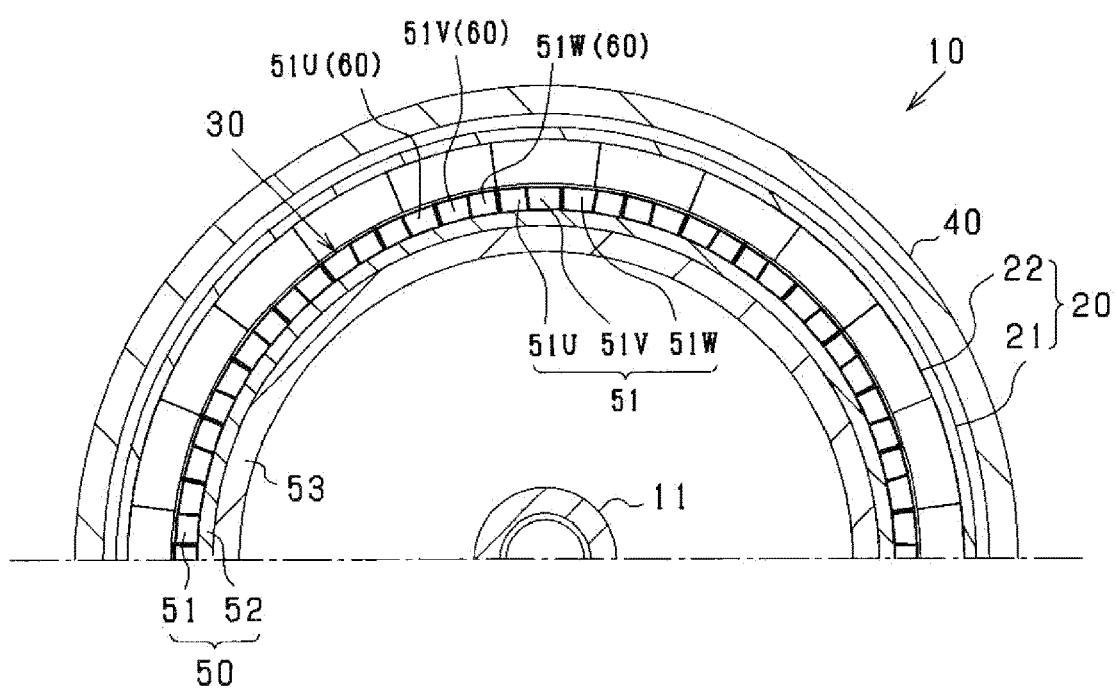
FIG. 1 is a cross-sectional view of a rotating electric machine according to an embodiment.

In an assumable example, an armature having multiphase armature windings made of conductive wires is known. When a magnetic flux from a field element interlinks with a conductor that constitutes a wire material, eddy current flows in the conductor and eddy current loss occurs. In order to reduce this eddy current loss, the wire material is provided with an assembly of strands.

There is a concern that the strands gathered at the ends of the conductive wire material may be untied. When the wires are untied, there is a concern that the workability in the manufacturing process of the armature winding will be lowered.

The present disclosure is to provide an armature winding and a method of manufacturing the same that can improve workability in the manufacturing process of the armature winding.

In a multiphase armature winding having a conductive wire material and provided in an armature that constitutes a rotating electric machine, the conductive wire material of each phase includes an assembly of strands having a conductor and an inner insulating layer made of an insulating material covering the conductor, and an outer insulating layer surrounding the assembly of strands and made of an insulating material.

The outer insulating layer is peeled off at an end of the conductive wire material, a tip of the conductive wire material at the peeled portion of the outer insulating layer is joined by welding or crimping to form a joint portion, and at least a portion other than the joint portion, in the conductive wire material at the peeled portion of the outer insulating layer, is varnished.

The conductive wire material of each phase includes the assembly of strands and the outer insulating layer made of an insulating material surrounding the assembly of strands. The strand has the conductor and the inner insulating layer of insulating material covering the conductor. The outer insulating layer is peeled off at the end of the conductive wire material for connecting the end of the conductive wire material to another electrical component.

A tip of the conductive wire material at the peeled portion of the outer insulating layer is joined by welding or crimping to form the joint portion. Therefore, it is possible to suitably suppress the occurrence of a situation in which the strands are untied at the end of the conductive wire material.

At least a portion other than the joint portion, in the conductive wire material at the peeled portion of the outer insulating layer, is the portion where the assembly of strands are exposed. At least this portion is varnished. As a result, in the peeled portion, the varnish may enter the recess part between the adjacent strands, or the varnish may enter the gaps inside the assembly of strands from between the strands. As a result, the varnish effectively clings and hardens to the portion of the assembly of strands that is exposed from the outer insulating layer. As a result, it is possible to more preferably suppress the occurrence of a situation in which the strands are untied at the end of the conductive wire material, thereby improving the workability in the manufacturing process of the armature winding.

A rotating electric machine according to the present disclosure is used, for example, as a vehicle power source.

The rotating electric machine may, however, be used widely for industrial, automotive, aerial, domestic, office automation, or game applications.

Figure 2:
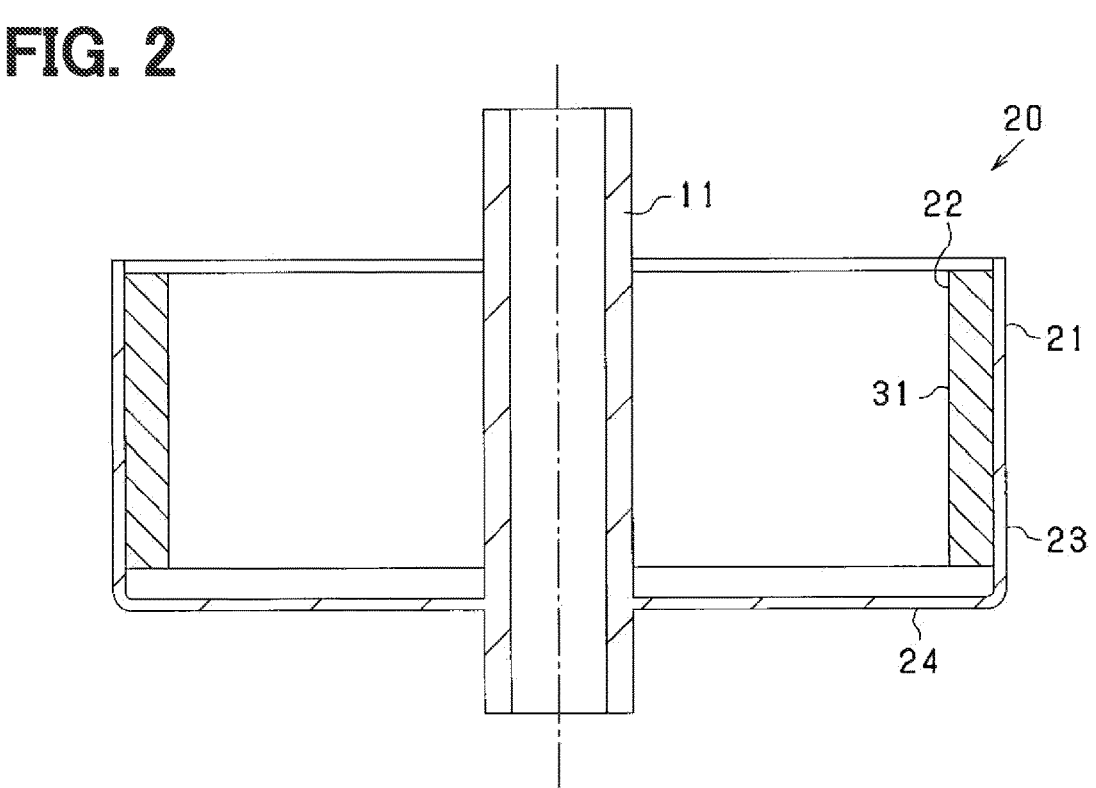
FIG. 2 is a longitudinal cross-sectional view of a rotor.

As shown in FIGS. 1 and 2, a rotating electric machine 10 is a synchronous multiphase alternating current (AC) motor and has an outer rotor structure (outer rotating structure). In the following description, in the rotating electric machine 10, a direction in which a rotating shaft 11 extends is defined as an axial direction, a direction radially extending from a center of the rotating shaft 11 is defined as a radial direction, and a direction circumferentially extending around the rotating shaft 11 is defined as a circumferential direction.

The rotating electric machine 10 includes a rotating electric machine main body having a rotor 20 and a stator unit 30, and a housing 40 provided so as to surround the rotating electric machine main body. Each of these members is disposed coaxially with the rotating shaft 11 integrally provided in the rotor 20, and is assembled in an axial direction in a predetermined order to form the rotating electric machine 10. The rotating shaft 11 is supported by a pair of bearings (not shown) provided in the stator unit 30 and the housing 40, respectively, and is rotatable in this state. The rotation of the rotating shaft 11 causes, for example, the axle of a vehicle to rotate. The rotating electric machine 10 can be mounted on a vehicle by fixing the housing 40 to a vehicle body frame or the like.

In the rotating electric machine 10, the stator unit 30 is provided so as to surround the rotating shaft 11, and the rotor 20 is disposed on the outer side of the stator unit 30 in the radial direction. The stator unit 30 includes a stator 50 and a stator holder 53 assembled to the inner side of the stator 50 in the radial direction. The rotor 20 and the stator 50 are disposed to face each other in the radial direction with an air gap interposed therebetween. The rotor 20 rotates integrally with the rotating shaft 11, so that the rotor 20 rotates on the outer side of the stator 50 in the radial direction. In the present embodiment, the rotor 20 corresponds to a "field element", and the stator 50 corresponds to an "armature".

Figure 6:
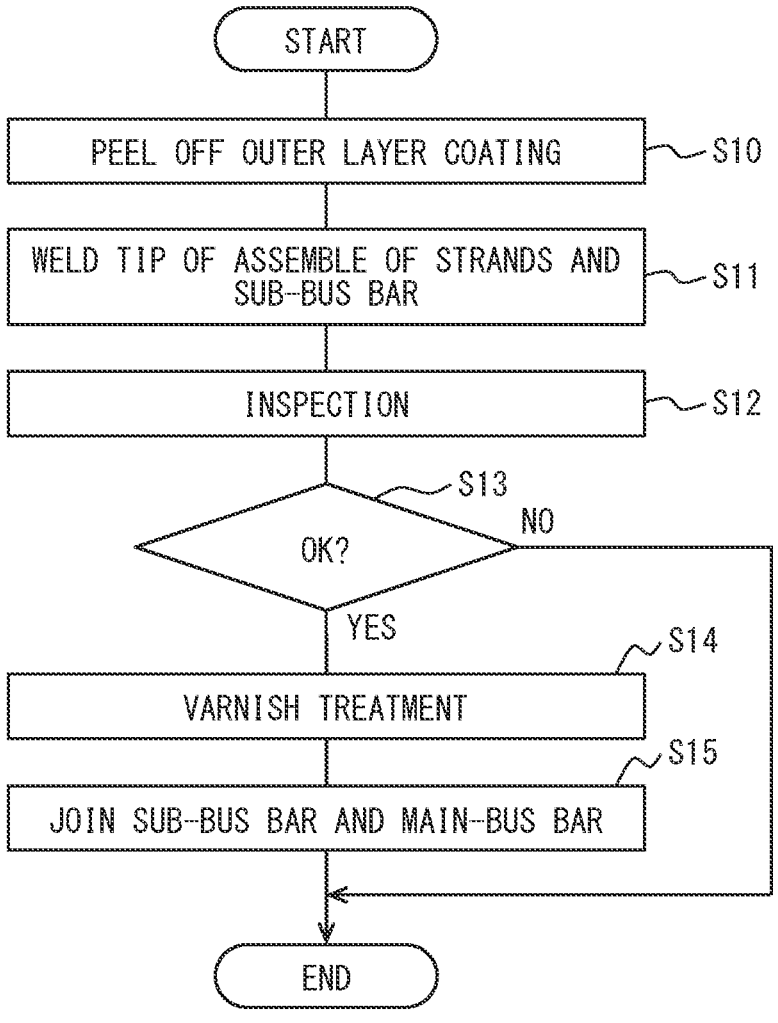
FIG. 6 is a flowchart showing a stator manufacturing process.

FIG. 6 is a longitudinal cross-sectional view of the rotor 20. As illustrated in FIG. 2, the rotor 20 includes a substantially cylindrical rotor carrier 21 and an annular magnet unit 22 fixed to the rotor carrier 21. The rotor carrier 21 includes a cylinder 23 having a cylindrical shape and an end plate portion 24 provided at one end of the cylinder 23 in the axial direction. The cylinder 23 and the end plate portion 24 are integrated to form the rotor carrier 21. The rotor carrier 21 functions as a magnet retainer, and the magnet unit 22 is fixed to the inner side of the cylinder 23 in the radial direction to have an annular shape. The rotating shaft 11 is fixed to the end plate portion 24. The cylinder 23 is made of, for example, a non-magnetic material, and specifically made of, for example, aluminum.

The magnet unit 22 has an annular shape concentric with a rotation center O of the rotor 20 and has a plurality of magnets 31 fixed to an inner peripheral surface of the cylinder 23. That is, the rotating electric machine 10 is a surface magnet type synchronous machine (SPMSM). The magnet 31 is provided so as to be surrounded by the cylinder 23 from the outside in the radial direction. In the magnet unit 22, the magnets 31 are provided side by side such that the polarities are alternately changed along the circumferential direction of the rotor 20. Thereby, a plurality of magnetic poles are formed in the magnet unit 22 in the circumferential direction. The magnet 31 is a polar anisotropic permanent magnet, and is formed using a sintered neodymium magnet having an intrinsic coercive force of 400 [kA/m] or more and a remanent flux density Br of 1.0 [T] or more.

A peripheral surface of the magnet 31 on the inner side in the radial direction is a magnetic flux acting surface on which a magnetic flux is transmitted and received. The magnet 31 is oriented so that the direction of the easy magnetization axis on the d-axis side, which is the magnetic pole center, is closer to the direction of the d-axis than the direction of the easy magnetization axis on the q-axis side, which is the magnetic pole boundary. As a result, on the magnetic flux acting surface of the magnet 31, magnetic flux is generated intensively in the region near the d-axis.

Next, a configuration of the stator unit 30 will be described.

The stator unit 30 includes the stator 50 and the stator holder 53 on the inner side of the stator 50 in the radial direction. The stator 50 has a stator winding 51 as an "armature winding" and a stator core 52 as an "armature core". The stator holder 53 is made of, for example, metal such as aluminum or cast iron, or carbon fiber reinforced plastic (CFRP), and has a cylindrical shape.

The stator 50 includes, in the axial direction, a portion corresponding to a coil side facing the magnet unit 22 in the rotor 20 in the radial direction, and a portion corresponding to a coil end that is the outer side of the coil side in the axial direction. In this case, the stator core 52 is provided in a range corresponding to the coil side in the axial direction.

The stator winding 51 has a plurality of phase windings. The phase windings of respective phases are disposed in a predetermined order in the circumferential direction to be formed in a cylindrical shape. In the present embodiment, the stator winding 51 has a three-phase windings including the U-phase, the V-phase, and the W-phase windings 51U, 51V, and 51W.

Figure 3:
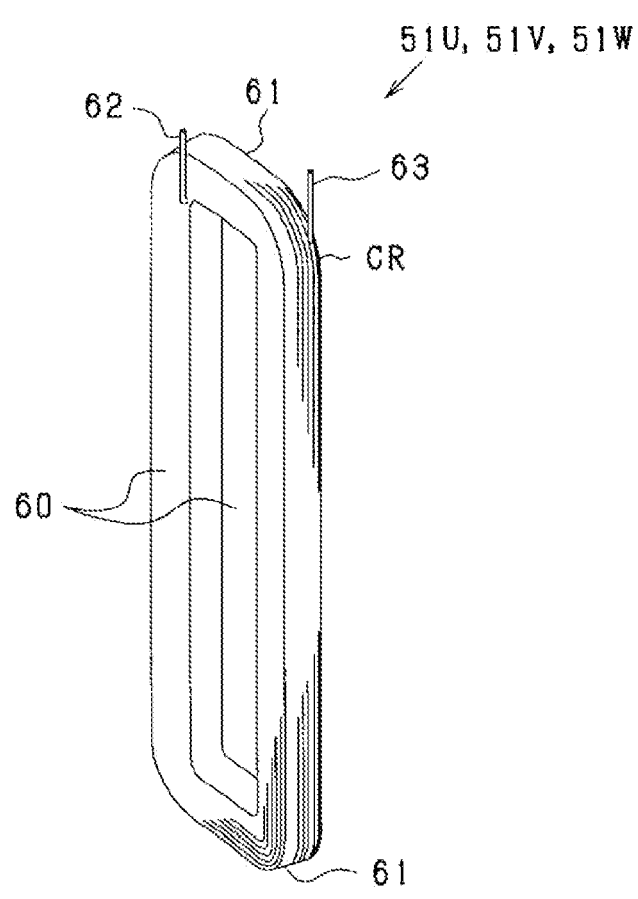
FIG. 3 is a perspective view of a stator winding.

The U-, V-, and W-phase windings 51U, 51V, and 51W are formed by winding a conductive wire material in multiple turns, as shown in FIG. 3, for example. The U-, V-, and W-phase windings 51U, 51V, and 51W includes a pair of intermediate conductor portions 60 and a pair of link portions 61. The pair of link portions 61 are provided to be in parallel to each other and have a linear shape. The pair of link portions 61 respectively connect the pair of intermediate conductor portions 60 at both ends in the axial direction. The U-, V-, and W-phase windings 51U, 51V, and 51W are formed to have an annular shape by the pair of intermediate conductor portions 60 and the pair of link portions 61. In the U-, V-, and W-phase windings 51U, 51V, and 51W, one end of the conductive wire material serves as a first end 62 and the other end serves as a second end 63. FIG. 1 shows an arrangement order of the intermediate conductor portions 60 forming the U-, V-, and W-phase windings 51U, 51V, and 51W in the coil side.

The stator core 52 is formed as a core sheet stacked body in which core sheets made of a magnetic steel sheet, which is a magnetic member, are stacked in the axial direction. The stator core 52 has a cylindrical shape having a predetermined thickness in the radial direction. The stator winding 51 is assembled to the outer side of the stator core 52 in the radial direction, that is, the rotor 20 side. The outer peripheral surface of the stator core 52 has a curved surface shape without protrusions and recesses. The stator core 52 functions as a back yoke. The stator core 52 is formed by stacking a plurality of core sheets in the axial direction. The core sheet is punched into, for example, an annular plate shape. However, the stator core 52 may have a helical core structure composed of strip-shaped core sheets.

In the present embodiment, the stator 50 has a slot-less structure having no tooth for forming a slot, but the configuration thereof may use any of the following (A) to (C).

(A) The stator 50 includes a conductor-to-conductor member between each adjacent two of the intermediate conductor portions 60 in the circumferential direction. As the conductor-to-conductor member, a magnetic material having a relationship of Wt×Bs≤Wm×Br is used, where Wt represents a width dimension in the circumferential direction of the conductor-to-conductor member in one magnetic pole, Bs represents a saturation magnetic flux density of the conductor-to-conductor member, Wm represents a width dimension in the circumferential direction of the magnet 31 in one magnetic pole, and Br represents a remanent flux density of the magnet 31.

(B) The stator 50 includes a conductor-to-conductor member between each adjacent two of the intermediate conductor portions 60 in the circumferential direction. A non-magnetic material is used as the conductor-to-conductor member.

(C) The stator 50 does not include a conductor-to-conductor member between each adjacent two of the intermediate conductor portions 60 in the circumferential direction.

Figure 4:
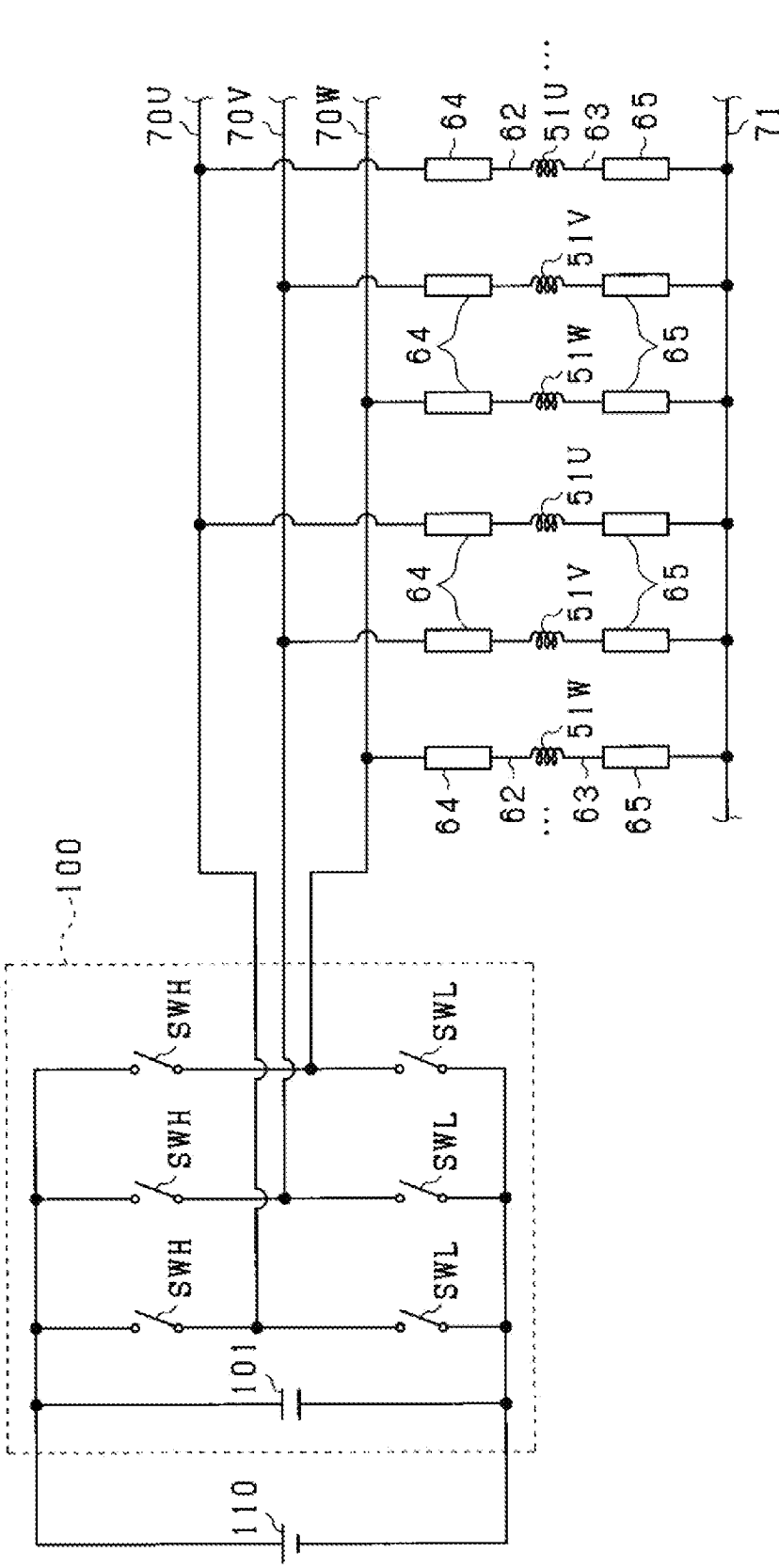
FIG. 4 is a diagram showing an electrical connection between the stator winding and an inverter.

Next, with reference to FIG. 4, the manner of electrical connection between each of windings 51U to 51W and an inverter 100 will be described.

The rotating electric machine 10 includes the inverter 100. The inverter 100 includes upper and lower arm switches SWH and SWL and a smoothing capacitor 101 corresponding to each phase. The inverter 100 is electrically connected to a storage battery 110, which is a DC power supply.

The rotating electric machine 10 includes U-, V-, and W-phase bus bars 70U, 70V, and 70W (corresponding to "components on the inverter side") as main-bus bars and a neutral point bus bar 71. Connection points of upper and lower arm switches SWH and SWL in inverter 100 are electrically connected to U-, V- and W-phase bus bars 70U, 70V and 70W. Each of the bus bars 70U, 70V, 70W, and 71 is fixed to the stator holder 53, for example.

The first ends 62 of U-, V- and W-phase windings 51U, 51V and 51W are electrically connected to U-, V- and W-phase bus bars 70U, 70V and 70W via first sub-bus bars 64, respectively. The neutral point bus bar 71 is electrically connected via second sub-bus bars 65 to the second ends 63 of the U-, V-, and W-phase windings 51U, 51V, and 51W.

Figure 5:
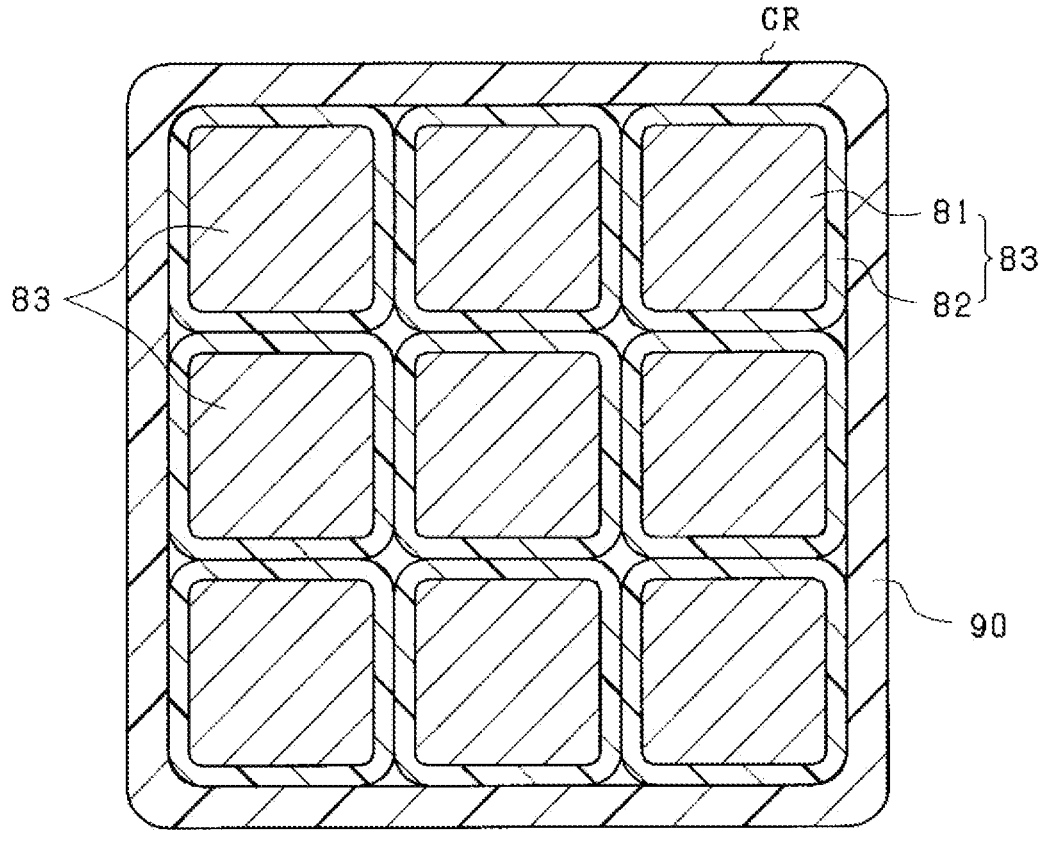
FIG. 5 is a cross-sectional view of a conductor.

Next, with reference to FIG. 5, the conductive wire material CR constituting each of the windings 51U, 51V, and 51W will be described.

The conductive wire material CR is a magnet wire, and includes an assembly of strands 83 having a conductor 81 made of a copper material and an inner layer coating 82 (corresponding to an "inner insulating layer") covering the conductor 81, and an outer layer coating 90 (corresponding to an "outer insulating layer") surrounding the assembly of strands 83. FIG. 5 exemplifies the conductive wire material CR composed of nine strands 83, but the number of strands 83 may be any number. Moreover, the cross-sectional shape of the conductive wire material CR is not limited to the rectangular shape shown in FIG. 5, and may be, for example, a circular shape.

The inner layer coating 82 is made of an insulating material having thermoplasticity and electrical insulation, and epoxy resin, for example, is used as the insulating material. The inner layer coating 82 is not limited to a single layer, and may be composed of multiple layers. The strand 83 may be a self-bonding wire. In this case, the inner layer coating 82 is covered with a self-bonding layer. Also, the conductive wire material CR may be a twisted wire in which a plurality of strands 83 are twisted.

The outer layer coating 90 is made of an insulating material having thermoplasticity and electrical insulation, and the synthetic resin such as PPS resin, PEEK resin, PI resin, or PAI resin is used as the insulating material.

The thickness of the outer layer coating 90 is made thicker than the thickness of the inner layer coating 82. This configuration is employed for correlation isolation. Further, the specific heat of the outer layer coating 90 is higher than the specific heat of the inner layer coating 82, and the glass transition temperature of the outer layer coating 90 is higher than the glass transition temperature of the inner layer coating 82.

Next, a manufacturing process of each phase winding 51U, 51V, and 51W that constitutes the stator 50 will be described with reference to FIG. 6. The U phase will be described below as an example.

Figure 7A:
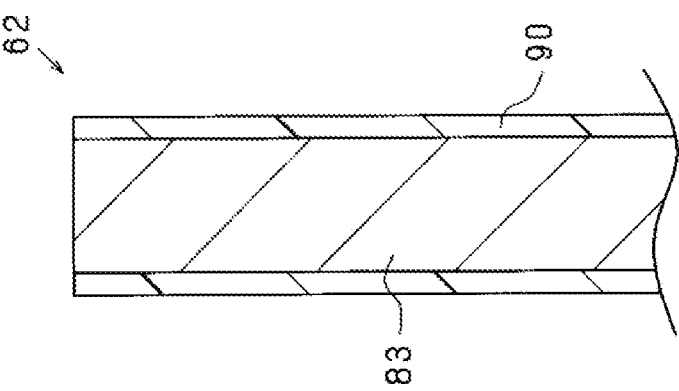
FIGS. 7A to 7C are diagrams showing a processing mode of a conductive wire material.
Figure 7B:
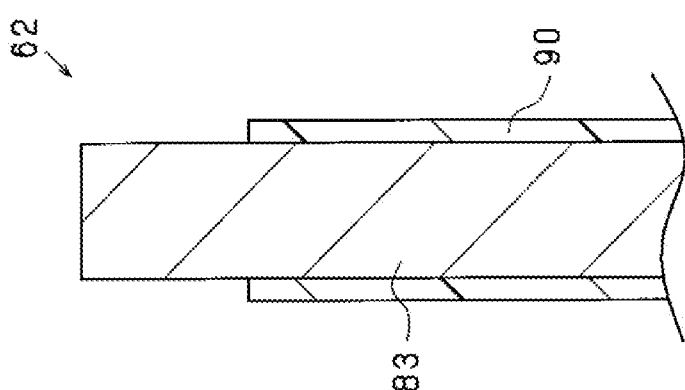

In step S10, the outer layer coating 90 is peeled off from the first end 62 of the conductive wire material CR using a coating peeling device. FIG. 7A shows a longitudinal sectional view of the first end 62 before peeling, and FIG. 7B shows a longitudinal sectional view of the first end 62 after peeling. FIG. 7 shows a simplified assembly of strands 83.

As the coating peeling device, for example, the device described below is used. The coating peeling device includes a gripping portion that grips the conductive wire material CR and peeling blades that peel off the outer layer coating 90 by coming into contact with the conductive wire material CR from both sides in the radial direction with respect to the first end 62 of the conductive wire material CR gripped by the gripping portion. The coating peeling device peels off the outer layer coating 90 at the first end 62 of the conductive wire material CR by sandwiching the conductive wire material CR with the peeling blades. Similarly, the outer layer coating 90 is peeled off by the coating peeling device with respect to the second end 63 as well.

Figure 7C:
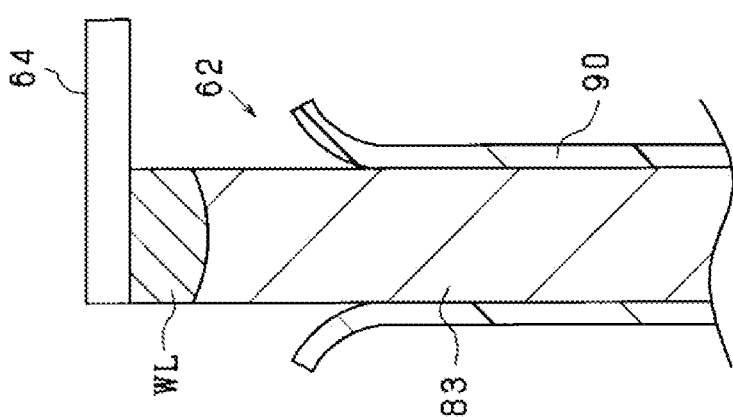

In the following step S11, in the first end 62 of the conductive wire material CR, the tip of the peeled portion of the outer layer coating 90 and the first sub-bus bar 64 are welded using a welding device. In the present embodiment, the welding device is a laser welding device. A laser beam used in the welding device include, for example, gas laser such as CO2 laser, solid laser such as YAG laser, fiber laser such as Yb fiber laser, and semiconductor laser such as LD (Laser Diode) laser. The laser beam is irradiated from the welding device to the vicinity of the contact portion between the tip of the peeled portion of the outer layer coating 90 and the first sub-bus bar 64 at the first end 62. As a result, the inner layer coating 82 of the irradiated portion by the laser beam is peeled off, and the vicinity of the contact portion between the tip of the peeled portion of the outer layer coating 90 and the first sub-bus bar 64 becomes the joint portion WL (FIG. 7C). At this time, since the joint portion WL is formed after the inner layer coating 82 is peeled off to expose the conductor 81, inclusion of the inner layer coating 82 in the joint portion WL is suppressed as much as possible. This suppresses an increase in the electrical resistance value of the joint portion WL.

In the welding process, as shown in FIG. 7C, the tip of the outer layer coating 90 is heated by the heat of welding, so that the tip of the outer layer coating 90 is turned up radially outward of the conductive wire material CR. In the example shown in FIG. 7C, the turned-up portion of the outer layer coating 90 spreads outward in the radial direction of the conductor portion 60 toward the tip of the first end 62. The specific heat of the outer layer coating 90 having thermoplastic is higher than the specific heat of the inner layer coating 82 having thermoplastic, and the glass transition temperature of the outer layer coating 90 is higher than the glass transition temperature of the inner layer coating 82. As a result, the inner layer coating 82 in the vicinity of the welded portion can be properly peeled off, and the turned-up portion can be properly formed without scorching the tip of the outer layer coating 90. In addition, due to the extension of the conductive wire material CR, the length of the peeled portion of the outer layer coating 90 at the first end 62 is longer than the length of the joint portion WL. This also contributes to properly forming the turned-up portion without scorching the tip of the outer layer coating 90.

In the first end 62 of the conductive wire material CR, the tip of the peeled portion of the outer layer coating 90 and the second sub-bus bar 65 are welded using a welding device. As a result, the tip of the outer layer coating 90 at the second end 63 is turned up radially outward of the conductive wire material CR.

In the following step S12, an inspection device inspects whether the first end 62 of the conductive wire material CR and the first sub-bus bar 64, and the second end 63 of the conductive wire material CR and the second sub-bus bar 65 are electrically connected by welding.

In the following step S13, based on the inspection result by the inspection device, it is determined whether both of the electrical continuity between the first end 62 and the first sub-bus bar 64 and the electrical continuity between the second end 63 and the second sub-bus bar 65 are established. When the electrical continuity between at least one of the first end 62 and the first sub-bus bar 64 and between the second end 63 and the second sub-bus bar 65 is not confirmed, for example, the conductive wire material to which the first sub-bus bar 64 and the second sub-bus bar 65 is welded and connected.

Figures 8A, 8B:
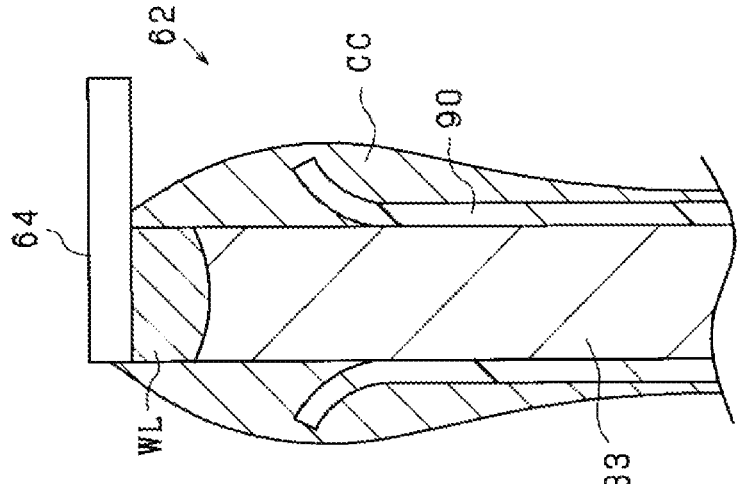
FIGS. 8A and 8B are diagrams showing a processing mode of the conductive wire material.

On the other hand, when it is determined that the electrical continuity between the first end 62 and the first sub-bus bar 64 and the electrical continuity between the second end 63 and the second sub-bus bar 65 are confirmed, in step S14, the varnish treatment is applied to the first end 62 and the second end 63 side of the conductive wire material CR using a varnish treatment device. FIG. 8A shows a state in which the varnish CC is applied to the first end 62. In the example shown in FIG. 8A, in the conductive wire material CR, in addition to the portion other than the joint portion of the peeled portion of the outer layer coating 90, the varnish CC is also applied to the joint portion WL and the portion of the outer layer coating 90 on the opposite side of the tip from the turned up portion. However, the varnish CC may be applied, for example, from the turned-up portion to the joint portion WL at the peeled portion of the outer layer coating 90 of the conductive wire material CR. Also, the varnish CC may be dried by, for example, a drying device.

In the following step S15, as shown in FIG. 8B, the first sub-bus bar 64 is joined to the U-phase bus bar 70U using an assembly device. Also, the second sub-bus bar 65 is joined to the neutral point bus bar 71 using the assembly device.

In the manufacturing process shown in FIG. 6, the operations of the film peeling device, the welding device, the inspection device, the varnish treatment device, the drying device, the assembly device, etc. are controlled by a controller mainly composed of a computer. In step S13, the controller determines whether or not the electrical continuity has been confirmed based on the inspection results.

According to the present embodiment described in detail above, the following effects can be obtained.

The outer layer coating 90 is peeled from the first end 62 and the second end 63 of the conductive wire material CR. Only the tip of the peeled portion of the outer layer coating 90 of the conductive wire material CR is joined by welding to form the joint portion WL. Therefore, it is possible to suitably suppress the occurrence of a situation in which the strands 83 are untied at the first end 62 and the second end 63.

Varnish CC is fixed to at least the exposed portion of the assembly of strands 83 and the joint portion WL of the peeled portion of the outer layer coating 90 in the conductive wire material CR. In the exposed portion, the varnish CC may enter the recess parts between the adjacent strands 83 and the varnish CC may enter the gaps inside the assembly of strands 83 from between the strands 83. As a result, the varnish CC effectively clings and hardens to the portion of the assembly of strands 83 exposed from the outer layer coating 90. As a result, it is possible to more preferably suppress the occurrence of a situation in which the strands 83 are untied at the first end 62 and the second end 63, thereby improving the workability in the manufacturing process of the stator winding 51.

When the tip of the peeled portion of the outer insulating layer 90 of the conductive wire material CR is welded in step S10, the tip of the outer insulating layer 90 having thermoplasticity is turned up radially outward of the conductive wire material due to the heat of the welding. The portion into which the varnish CC enters is formed between the outer layer coating 90 that has been turned up and the assembly of strands 83. Therefore, the varnish treatment in step S14 allows the varnish CC to more effectively cling to the conductive wire material CR.

In the welding process, the turned-up portion of the outer layer coating 90 can be formed together with the joint portion WL. Therefore, a structure for effectively clinging the varnish CC can be efficiently formed in the welding process.

The thickness of the outer layer coating 90 is made thicker than the thickness of the inner layer coating 82. Further, the specific heat of the outer layer coating 90 is higher than the specific heat of the inner layer coating 82, and the glass transition temperature of the outer layer coating 90 is higher than the glass transition temperature of the inner layer coating 82. As a result, when welding the tip of the conductive wire material CR in the welding step, it is possible that the peeled portion of the outer insulation coating 90 is properly formed without burning the tip of the outer insulation coating 90, and the joint portion is formed after removing the inner insulating coating 82 as much as possible by the heat of welding.

The windings of each phase confirmed to be electrically conductive in step S13 are connected to the bus bars of each phase and the neutral point bus bar 71. Therefore, it is possible to suitably suppress the occurrence of problems such as complication of the work process and the occurrence of parts discarding.

Other Embodiments

The above embodiment may be modified as follows.

The outer insulating layer is not limited to a coating, and may be formed of, for example, a tape spirally wound around an assembly of strands 83. Enamel, for example, may be used as the inner layer coating 82.

The welding in step S11 of FIG. 6 is not limited to the laser welding, and may be an arc welding such as TIG welding, or an electron beam welding.

Further, in step S11, instead of welding, the joint portion may be formed by pressure contact using a pressure contact device (for example, punch pressure contact).

Figure 9:
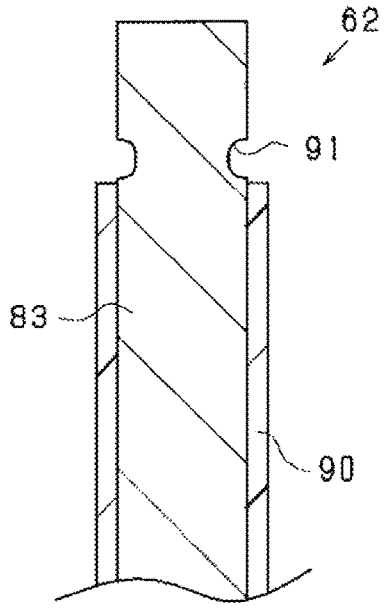
FIG. 9 is a diagram showing a processing mode of the conductive wire material according to another embodiment.

In step S10, the outer layer coating 90 is peeled off by pinching the conductive wire material CR with peeling blades using the coating peeling device, and by pinching, as shown in FIG. 9, a recess part 91 may be formed in the base end of the peeled portion of the outer layer coating 90 in the assemble of strands 83. Since the varnish CC enters the recess part 91, the varnish CC can more effectively cling to the conductive wire material CR. Therefore, the recess part 91 for effectively clinging the varnish CC can be formed efficiently, and workability in the manufacturing process of the stator winding 51 can be improved.

Figure 10:
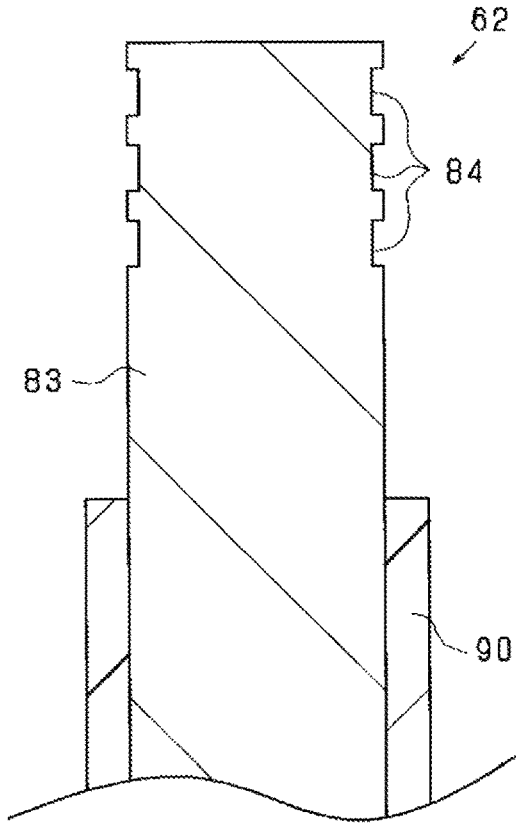
FIG. 10 is a diagram showing a processing mode of the conductive wire material according to other embodiment.

In step S10, when the inner layer coating 82 is peeled off by the laser welding in the welding process, as shown in FIG. 10, a plurality of (three are exemplified) recess parts 84 may be formed in the conductor 81 exposed at the peeled portion of the inner layer coating 82 by the heat of the laser welding. The recess parts 84 are formed, for example, by melting the conductor 81 with the heat of laser welding. As a result, unevenness is formed on the surface of the conductor 81, and the varnish CC enters the unevenness in the varnishing step of step S14, so that the varnish CC can more effectively cling to the conductive wire material CR. Therefore, the recess part 84 for effectively clinging the varnish CC can be formed efficiently in the welding process, and workability in the manufacturing process of the stator winding 51 can be improved.

In step S10, the outer layer coating 90 may be peeled off by irradiating the outer layer coating 90 with a laser beam from a laser welding device instead of the coating peeling device. In this case, in addition to the outer layer coating 90, the inner layer coating 82 inside the outer layer coating 90 may be peeled off at the same time. For example, the outer layer coating 90 and the inner layer coating 82 can be properly peeled off at the same time by setting the thicknesses, specific heats, and glass transition temperatures of the inner layer coating 82 and the outer layer coating 90.

The rotating electric machine is not limited to a star connection, and may be a Δ connection.

The rotating electric machine is not limited to the outer rotor type rotating electric machine, and may be an inner rotor type rotating electric machine. Further, the rotating electric machine is not limited to the one having the slotless structure, and may be one having teeth.

Of the field element and the armature, the rotating electric machine is not limited to the rotating electric machine in which the field element is the rotor, and may be the rotating electric machine in which the armature is the rotor.

The disclosure in the present specification is not limited to the illustrated embodiments. The disclosure encompasses the illustrated embodiments and modifications based on the embodiments by those skilled in the art. For example, the disclosure is not limited to the combinations of components and/or elements shown in the embodiments. The disclosure may be implemented in various combinations. The disclosure may have additional portions that may be added to the embodiments. The disclosure encompasses omission of components and/or elements of the embodiments. The disclosure encompasses the replacement or combination of components and/or elements between one embodiment and another. The disclosed technical scope is not limited to the description of the embodiments. The several technical ranges disclosed are indicated by the description of the claims, and should be construed to include all modifications within the meaning and range equivalent to the description of the claims.

The present disclosure has been described based on examples, but it is understood that the present disclosure is not limited to the examples or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

As for a means 2 according to the means 1, the tip of the outer insulating layer is turned up radially outward of the conductive wire material.

In the means 2, a portion into which the varnish enters is formed between the turned-up outer insulating layer and the assembly of strands. As a result, the varnish can more effectively cling to the conductor.

In a means 3 according to the means 1 or 2, a conductive member which is a member joined to the joint portion and electrically connects the component on the inverter side and the conductor is provided.

According to the means 3, it is possible to improve the workability in the case of electrically connecting the conductors constituting the conductive wire material to the components on the inverter side.

In a means 4 according to any one of the means 1 to 3, a recess part is formed at the base end of the peeled portion of the outer insulating layer in the assembly of strands.

In the means 4, the varnish enters the recess part of the base end. As a result, the varnish can more effectively cling to the conductor.

In a means 5 according to any one of means 1 to 4, the inner insulating layer is peeled off at the tip of the peeled portion of the outer insulating layer in the assembly of strands, and the joint portion is formed at the tip of the peeled portion of the inner insulating layer.

A plurality of recess parts are formed in the conductor at the peeled portion of the inner insulating layer.

In the means 5, the varnish enters a plurality of recess parts formed in the conductor. As a result, the varnish can more effectively cling to the conductor.

Here, the armature winding of the means 1 can be manufactured like a means 6, for example. The means 6 includes a peeling step of peeling off the outer insulating layer at the end of the conductive wire material, a joining step of forming the joint portion by welding or crimping the tip of the conductive wire material at the peeled portion of the outer insulating layer, and a step of applying a varnish treatment to at least a portion other than the joint portion, in the conductive wire material at the peeled portion of the outer insulating layer.

In a means 7 according to the means 6, the outer insulating layer has thermoplasticity. The joining step is a step of forming the joint portion by welding the tip of the conductive wire material at the peeled portion of the outer insulating layer, and the tip of the outer insulating layer is heated by welding in the joining step, whereby the tip of the outer insulating layer is turned up radially outward of the conductive wire material.

In the means 7, a step of applying the varnish treatment is performed after the peeling step and the joining step. Here, when the tip of the peeled portion of the outer insulating layer of the conductive wire material is welded, the tip of the outer insulating layer having thermoplasticity is turned up radially outward of the conductive wire material due to the heat of the welding. In other words, in the joining step, it is possible to form the turned up portion of the outer insulating layer together with the joint portion. Therefore, a structure for effectively clinging the varnish can be efficiently formed, and workability in the manufacturing process of the armature winding can be improved.

In a means 8 according to the means 7, the inner insulating layer has thermoplasticity. A thickness of the outer insulating layer is thicker than a thickness of the inner insulating layer, and a specific heat of the outer insulation layer is greater than a specific heat of the inner insulation layer.

A potential difference between each strand in the assembly is relatively small. On the other hand, the potential difference between the conductive wire material in each of the different phases becomes very large, and it is necessary to require a correlative insulation of the conductive wire materials in each of the different phases. Therefore, in the means 8, the thickness of the outer insulating layer is made thicker than the thickness of the inner insulating layer. Here, in the means 8, the specific heat of the thermoplastic outer insulating layer is greater than the specific heat of the thermoplastic inner insulating layer. For this reason, when welding the tip of the conductive wire material in the joining step, it is possible that the peeled portion of the outer insulation layer is properly formed without burning the tip of the outer insulation layer, and the joint portion is formed after removing the inner insulating layer as much as possible by the heat of welding.

In a means 9 according to the means 7 or 8, the inner insulating layer has thermoplasticity. A thickness of the outer insulating layer is thicker than a thickness of the inner insulating layer, and a glass transition temperature of the outer insulating layer is higher than a glass transition temperature of the inner insulating layer.

In the means 9, the glass transition temperature of the outer insulating layer is higher than the glass transition temperature of the inner insulating layer. For this reason, when welding the tip of the conductive wire material in the joining step, it is possible that the peeled portion of the outer insulation layer is properly formed without burning the tip of the outer insulation layer, and the joint portion is formed after removing the inner insulating layer as much as possible by the heat of welding.

In a means 10 according to any one of the means 6 to 9, the joining step is a step of forming the joint portion by a welded portion between the tip and the conductive member by welding the tip of the peeled portion of the conductive wire material from which the outer insulating layer has been removed and the conductive member.

According to the means 10, it is possible to improve the workability when electrically connecting the conductors constituting the conductive wire material to other electric components.

A means 11 according to the means 10 includes an inspection step of inspecting whether or not the conductor and the conductive wire material are electrically connected after the joining step, and a step of electrically connecting the conductive wire material, which has been confirmed to be electrically conductive in the inspection step, to a component on the inverter side.

In the joining step, after electrically connecting the conductive member welded to the conductive wire material to the component on the inverter side, it may be inspected whether or not there is electrical continuity between the conductor constituting the conductive wire material and the conductive member. However, in this case, when the electrical continuity cannot be confirmed in the inspection, for example, it becomes necessary to remove the conductive member from the component on the inverter side, and a problem such as complicating the work process may arise. Further, for example, there may arise a problem that the inverter-side component electrically connected to the conductive member must be discarded together with the conductive member to which the conductive wire material is connected.

In this regard, in the means 11, the conductive member, which has been confirmed to be electrically conductive in the inspection step, is electrically connected to the component on the inverter side. Therefore, it is possible to suitably suppress the occurrence of the problem described above.

In a means 12 according to any one of the means 6 to 11, the peeling step peels off the outer insulating layer at the end of the conductive wire material by sandwiching the conductive wire material with a coating peeling device, and by sandwiching, forming the recess part at the base end of the peeled portion of the outer insulating layer in the assembly of strands.

In the means 12, in the peeling step, the outer insulating layer can be peeled off, and a recess part can be formed at the base end of the peeled portion of the outer insulating layer. As a result, in the process of applying the varnish treatment, the varnish can effectively cling by entering the recess part. As described above, according to the means 12, the structure for effectively clinging the varnish can be efficiently formed in the step of removing the outer insulating layer, and the workability in the manufacturing process of the armature winding can be improved.

In means 13 according to any one of means 6 to 12, the joining step peels off the inner insulating layer at the tip of the assemble of strands by welding the tip of the peeled portion of the outer insulating layer of the conductive wire material, thereby the tip of the peeled portion of the inner insulating layer is used as the joint portion, and when the inner insulating layer is peeled off by welding in the joining step, a plurality of recess parts are formed in the conductor exposed at the peeled portion of the inner insulating layer due to the heat of welding.

In the means 13, in the joining step, the inner insulating layer can be peeled off, and a plurality of recess parts can be formed in the conductor exposed at the peeled portion of the inner insulating layer. As a result, in the process of applying the varnish treatment, the varnish can effectively cling by entering the plurality of recess parts. As described above, according to the means 13, the structure for effectively clinging the varnish can be efficiently formed in the joining step, and the workability in the manufacturing process of the armature winding can be improved.

What is claimed is:

1. An armature winding provided in an armature constituting a rotating electric machine, comprising:
   a conductive wire material; and
   a plurality of phase windings, wherein
   the conductive wire material of each phase includes
      an assembly of strands having a conductor and an inner insulating layer made of an insulating material covering the conductor, and
      an outer insulating layer surrounding the assembly of strands and made of an insulating material,
   the outer insulating layer is peeled off at an end of the conductive wire material,
   a tip of the conductive wire material at the peeled portion of the outer insulating layer is joined by welding or crimping to form a joint portion, and a varnish treatment is applied to at least a portion other than the joint portion, in the conductive wire material at the peeled portion of the outer insulating layer.

2. The armature winding according to claim 1, wherein a tip of the outer insulating layer is turned up radially outward of the conductive wire material.

3. The armature winding according to claim 1, further comprising:

a conductive member which is a member joined to the joint portion and electrically connects a component on an inverter side and the conductor.

4. The armature winding according to claim 1, wherein a recess part is formed at a base end of the peeled portion of the outer insulating layer in the assembly of strands.

5. The armature winding according to any one of claim 1, wherein the inner insulating layer is peeled off at the tip of the peeled portion of the outer insulating layer in the assembly of strands, and the joint portion is formed at the tip of the peeled portion of the inner insulating layer, and a plurality of recess parts are formed in the conductor at the peeled portion of the inner insulating layer.

6. A method for manufacturing the armature winding according to claim 1, comprising:

a peeling step of peeling off the outer insulating layer at the end of the conductive wire material;

a joining step of forming the joint portion by welding or crimping the tip of the conductive wire material at the peeled portion of the outer insulating layer; and a step of applying a varnish treatment to at least a portion other than the joint portion, in the conductive wire material at the peeled portion of the outer insulating layer.

7. The method for manufacturing the armature winding according to claim 6, wherein the outer insulating layer has thermoplasticity, the joining step is a step of forming the joint portion by welding the tip of the conductive wire material at the peeled portion of the outer insulating layer, and the tip of the outer insulating layer is heated by welding in the joining step, whereby the tip of the outer insulating layer is turned up radially outward of the conductive wire material.

8. The method for manufacturing the armature winding according to claim 7, wherein the inner insulating layer has thermoplasticity, a thickness of the outer insulating layer is thicker than a thickness of the inner insulating layer, and a specific heat of the outer insulation layer is greater than a specific heat of the inner insulation layer.

9. The method for manufacturing the armature winding according to claim 7, wherein the inner insulating layer has thermoplasticity, a thickness of the outer insulating layer is thicker than a thickness of the inner insulating layer, and a glass transition temperature of the outer insulating layer is higher than a glass transition temperature of the inner insulating layer.

10. The method for manufacturing the armature winding according to claim 6, wherein the joining step is a step of forming the joint portion by a welded portion between the tip and a conductive member by welding the tip of the peeled portion of the conductive wire material from which the outer insulating layer has been removed and the conductive member.

11. The method for manufacturing the armature winding according to claim 10, further comprising:

an inspection step of inspecting whether or not the conductor and the conductive wire material are electrically connected after the joining step, and a step of electrically connecting the conductive wire material, which has been confirmed to be electrically conductive in the inspection step, to a component on an inverter side.

12. The method for manufacturing the armature winding according to claim 6, wherein the peeling step peels off the outer insulating layer at the end of the conductive wire material by sandwiching the conductive wire material with a layer peeling device, and by sandwiching, forms a recess part at a base end of the peeled portion of the outer insulating layer in the assembly of strands.

13. The method for manufacturing the armature winding according to claim 6, wherein the joining step peels off the inner insulating layer at a tip of a assemble of strands by welding the tip of the peeled portion of the outer insulating layer of the conductive wire material, thereby the tip of the peeled portion of the inner insulating layer is used as a joint portion, and when the inner insulating layer is peeled off by welding in the joining step, a plurality of recess parts are formed in a conductor exposed at the peeled portion of the inner insulating layer due to heat of welding.

14. A rotating electric machine, comprising:

a rotor; and a stator facing the rotor, wherein the stator includes an armature winding having a plurality of phase windings by winding a conductive wire material, the conductive wire material of each phase includes an assembly of strands having a conductor and an inner insulating layer made of an insulating material covering the conductor, and an outer insulating layer surrounding the assembly of strands and made of an insulating material, the outer insulating layer is peeled off at an end of the conductive wire material, a tip of the conductive wire material at the peeled portion of the outer insulating layer is joined by welding or crimping to form a joint portion, and a varnish treatment is applied to at least a portion other than the joint portion, in the conductive wire material at the peeled portion of the outer insulating layer.

\* \* \* \* \*